Jesse D. Skelton Inventor

Jesse D. Skelton   Inventor

By James A. Reilly   Attorney

United States Patent Office 3,284,769
Patented Nov. 8, 1966

3,284,769
RECORDING METHOD FOR FM
CONTINUOUS WAVES
Jesse D. Skelton, Houston, Tex., assignor to Esso Production Research Company, a corporation of Delaware
Continuation of application Ser. No. 795,233, Feb. 24, 1959. This application May 25, 1965, Ser. No. 461,599
1 Claim. (Cl. 340—15.5)

This application is a continuation of Serial Number 795,233, filed on February 24, 1959, now abandoned.

The present invention relates to the processing of seismic information and more particularly relates to an improved method for recording seismic data for subsequent analysis and interpretation. In still greater particularity, the present invention relates to a recording system which prevents the masking of weak seismic signals reflected from discontinuities deep beneath the earth's surface by stronger signals arriving by shallow or surface routes during seismic prospecting operations carried out with a frequency modulated source.

The use of seismic methods of prospecting for subterranean deposits of minerals, petroleum and natural gas is widespread. In essence, such methods involve the generation of an impulse at or near the earth's surface under conditions such that an elastic wave having a frequency within the seismic range is transmitted downwardly into the earth. Generally the impulse which sets up the elastic wave is produced by the detonation of a high explosive charge in a shot hole but other methods, weight dropping for example, are also used. When an elastic wave thus generated encounters strata of varying densities or other subsurface discontinuities as it travels downwardly, at least a portion of the energy in the wave is reflected and returned toward the earth's surface. The wave energy reaching the surface is picked up by one or more seismic detectors or geophones positioned at locations remote from the point where the wave was initially generated and is converted into electrical energy. Each seismic detector generally receives a number of reflected waves which vary both in magnitude and in arrival time, the variations depending upon the number of discontinuities in the subsurface structure. Due to these variations, the electrical energy produced by each detector generally forms a complex sinusoidal type signal varying in amplitude with time and having particularly prominent variations in amplitude at times corresponding to the arrival of the reflected waves.

By noting the time at which such a seismic impulse is initiated and subsequently measuring the elapsed time required for seismic waves to be reflected to one or more seismic detectors from subsurface discontinuities, much useful information concerning the nature and depth of the discontinuities can be obtained. To secure this information, a seismograph is used to record the moment at which the seismic impulse was generated and the times at which the reflected waves reach the detectors, which are spaced at known distances from the point of impulse. Normally such a seismograph records the signal from each detector or selected group of detectors in the form of a separate trace on a seismogram. Each trace thus comprises a record of the variations with time in the output of the detector or detectors associated with the trace.

Early seismographic traces were generally of the oscillographic type and were formed by the movement of a suitable tracing pen or a beam of light across a recording chart or a photographic film. In recent years apparatus productive of traces of this type has largely been supplanted by seismographs which record the seismic detector signals as variable density photographic traces, variable area photographic traces, magnetic traces and similar readily reproducible traces. The use of such equipment has been spurred by the development of apparatus which permits the trace to be recorded, subsequently corrected to compensate for undesirable components, and then rerecorded.

One disadvantage associated with the use of these and similar seismic prospecting methods is that an impulse generated by the detonation of an explosive charge, by the dropping of a weight, or by related techniques persists only for an extremely short period of time. As a result, the useful information obtained from a single impulse is somewhat limited and it is frequently necessary to generate repeated impulses, using the same seismic detector or geophone array, in order to ascertain that complete and accurate information concerning subsurface conditions is obtained. Using explosives or similar techniques, this is both expensive and time consuming. In order to overcome this difficulty, it has been suggested heretobefore that so-called continuous wave prospecting methods be employed. By using a vibrator or similar device which will generate a series of impulses within the seismic frequency band over a relatively prolonged period of time, wave energy reflected from subsurface discontinuities can be repeatedly recorded and subsequently analyzed without the necessity of setting off a series of separate explosive charges or the like.

Because of difficulties in ascertaining the arrival time of reflected seismic waves, a fixed frequency source of impulses is not practical in continuous wave prospecting. The most promising method yet suggested for avoiding these difficulties has been the use of a frequency modulated source. Although there are several ways in which such a source can be utilized, a particularly effective method is to employ a vibratory signal made up of a succession of energy pulses which is nonrepetitive over a time interval substantially longer than the time required for the wave energy generated by the signal to travel from the source to the most remote substrata from which it can be reflected at useable energy levels and thence to detectors positioned on the earth's surface at points removed from the source. For a predetermined period which is at least as long as the wave energy travel time plus the uninterrupted duration of the transmitted signal or twice the travel time, whichever is shorter, the detectors pick up energy waves which are first representative of the transmitted signal and later represent a composite of the transmitted signal plus the energy reflected from subsurface discontinuities encountered by the transmitted signal. By thereafter shifting the time-phase relationship of the composite signal to compensate for the components thereof attributable to the transmitted signal, a correlated trace indicative of the reflected waves can be obtained. The extent to which the time-phase relationship must be shifted to obtain this correlated tract is a parameter of the travel time of the reflected waves.

In actual practice it has been found that difficulties are encountered with systems of this type because of differences in the magnitude of the waves reaching the detectors by direct routes and the magnitudes of the reflected waves picked up by the detectors. The wave energy reaching the detectors from the signal source by traveling along the surface may be a thousand or more times greater than the reflected wave energy which reaches the detectors. Since these energy waves are in part recorded simultaneously, the direct energy may make it extremely difficult to distinguish the reflected waves from noise inherent in the recording system. A similar situation exists with respect to waves reflected to the detectors from a shallow discontinuity as compared to those reflected from substrata at greater distances beneath the earth's surface. The waves reflected from shallow discontinuities tend to greatly overshadow those from deeper discontinuities and thus make subsequent detection of the latter extremely difficult. It can be seen that these difficulties become exceedingly complex in seismic prospecting operations wherein signals are reflected from a large number of discontinuities at different depths beneath the earth's surface.

The present invention provides a new and improved method for use in seismic prospecting operations carried out with a frequency modulated source signal which prevents strong signals reaching the seismic detectors by shallow or surface routes from masking subsequent weak signals. In accordance with the invention, it has now been found that the aforementioned difficulties can be largely obviated by employing a recording system wherein the signal picked up by the seismic detector or detectors is passed through a bank of sharply peaked filters, each filter having a separate adjacent band width, and the output of each filter is then separately recorded for later correlation and analysis. Such a system permits electrical transients representing the wave energy reaching the detectors by direct routes, those representing that reflected from relatively shallow formations, and those representing that reflected from relatively deep formations at any instant to be separately amplified and recorded so that the stronger signals do not control the amplifier automtic gain control and force the subsequent weaker signals into the noise range.

Seismic information recorded in accordance with the invention may be processed in several different ways in order to obtain a final correlated trace which will yield an accurate picture of subsurface conditions in the area being surveyed. One method of accomplishing this is to employ a series of playback amplifiers and an output signal mixer in conjunction with the normal correlation process used to sort out individual seismic events. By controlling the output of the individual amplifiers, each recorded signal can be fed into the output signal mixer at about the same amplitude in order to obtain a composite signal readily susceptible of correlation.

A second method which can be used is to employ a series of playback amplifiers in conjunction of series of time delay units, each feeding a full wave rectifier, and then to mix equally the rectified signals. By adjusting the time delay units to have a delay period corresponding to the time sequence of the frequency modulated source wave, an output signal having maximum values which indicate the arrival at the detectors of seismic events having a time succession of frequencies corresponding to those of the original transmitted signal can be obtained.

These and other aspects of the invention can be more fully understood by referring to the following description of apparatus useful in the practice of the invention and operations carried out with such apparatus and to the accompanying drawings illustrative of such apparatus and operations.

Referring now to the drawings.

Figure 1:
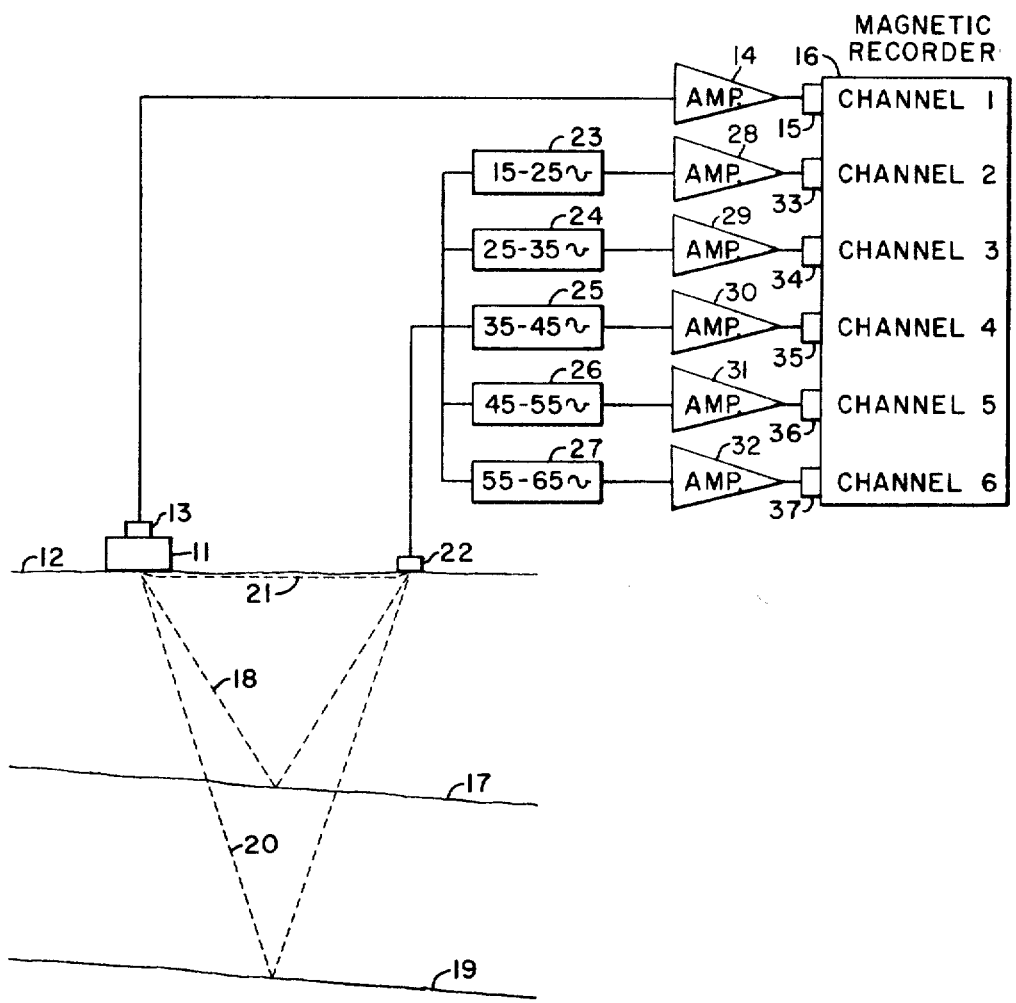
FIGURE 1 depicts in simplified form a seismic prospecting operation carried out with a frequency modulated source of vibratory energy and a recording system embodying the concept of the invention.

Turning now to FIGURE 1, reference numeral 11 designates an elastic wave generator positioned on the surface of the earth which is represented by line 12. Generator 11 may be an electrical vibrator, an unbalanced flywheel, or a similar device capable of generating a vibratory impulse in the seismic frequency range, about 10 to 100 cycles per second. The generator selected is provided with means for varying the frequency of the signal generated and thus permits the transmission of a frequency modulated wave. Since frequencies at the upper and lower extremes of the 10 to 100 cycles per second frequency range generally include some noise, the generated signal will usually, but not necessarily, have a somewhat narrower range. A typical signal may vary linearly from about 20 to about 80 cycles per second over a two-second interval. A seismic detector or geophone 13 is positioned on or contiguous to generator 11 in order to produce an electrical counterpart of the transmitted signal. The electrical transients generated by detector 13 are amplified in a conventional seismic amplifier 14 and recorded as a separate trace by recording head 15 upon a magnetic tape or similar recording medium 16. This separate trace may later be used in correlating information obtained during the seismic prospecting operation. Equipment for detecting and magnetically recording seismic impulses in this manner will be familiar to those skilled in the art.

The elastic wave created by generator 11 travels outwardly from the generator in all directions. A portion of the energy transmitted downwardly into the earth by the generator will be reflected back toward the surface upon reaching the first discontinuity beneath the surface, represented by line 17. The path of this reflected energy is shown in FIGURE 1 by dotted line 18. Additional energy will subsequently be reflected in the direction of the earth's surface as the signal from generator 11 later encounters lower discontinuities such as that represented by line 19. The path of energy reflected from lower discontinuity 19 is depicted by dotted line 20. A portion of the energy produced by the generator will also travel along the earth's surface, for example along the path designated by line 21 in FIGURE 1.

The energy reflected as described above upon reaching the earth's surface will be detected by a seismic detector or geophone 22 positioned at a point removed from the source of the elastic wave. Energy traveling along the surface from the source will be similarly detected. Although a single detector is shown in the drawing, it will be recognized by those skilled in the art that in most cases it will be preferred to employ a plurality of detectors arranged in a suitable predetermined pattern or array spread over a considerable area, each detector having a separate recording system such as that shown in FIGURE 1.

The energy detected by detector 22 is converted by the detector into electrical transients which are conducted to a bank of sharply-peaked electrical filters, each of which has a separate band width adjacent to but independent of band width of other filters in the bank. The filters are selected so that in combination they cover the portion of the seismic frequency range of interest. In FIGURE 1 this bank of filters is designated by reference numerals 23, 24, 25, 26 and 27, each numeral identifying a separate filter having an independent band width of ten cycles per second. As thus described filters 23 through 27 cover a frequency band extending from fifteen cycles per second to 65 cycles per second but it will be understood that a greater or lesser number of filters having narrower or wider frequency ranges may be employed if desired. In general, filters covering from about five to about 20 cycles per second in sufficient numbers to extend over a band width of from ten to about 80 or more cycles per second may be employed. The exact range selected will, of course, depend to a considerable extent upon the particular area in which the seismic prospecting operation is being carried out and upon the frequency characteristics of the source signal which is employed.

Upon reaching filters 23 through 27, the electrical transients generated by detector 22 in response to the seismic waves are resolved into bands having frequency ranges determined by the band pass characteristics of the filters. Each of these bands is separately amplified in one of a series of conventional seismic amplifiers having automatic gain control facilities, shown in FIGURE 1 as amplifiers 28 through 32, and may thereafter be separately recorded on recording medium 16 by means of individual recording heads 33 through 37. The apparatus described up to this point thus provides a means for resolving a frequency modulated seismic signal into a series of transients of preselected frequency characteristics and separately amplifying each of the transients thus produced. This separate amplification of the transients according to their frequency characteristics permits weak events in the seismic signal picked up by the detector or geophone, those from deep underlying discontinuities for example, to be amplified to useful levels without being crowded into the background noise due to the automatic gain control of the amplifiers.

Figure 2:
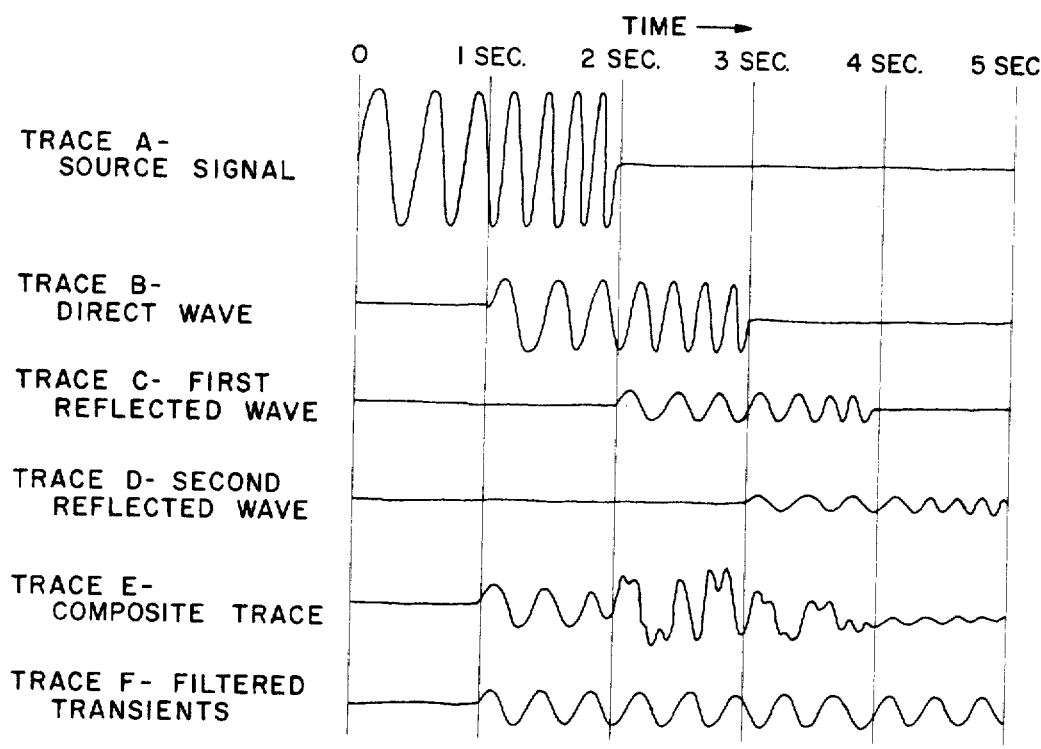
FIGURE 2 represents wave forms useful in illustrating the operation of the invention.

A clearer understanding of the function and operation of the apparatus shown in FIGURE 1 of the drawing can be derived from FIGURE 2, which depicts the waveforms which would result if the source signal, the direct energy, and the reflected energy produced as described above could be separately detected and recorded. Assume for simplicity's sake that the elastic wave generated by source 11 varies in frequency in a linear manner from 20 to 80 cycles per second over a two-second interval, that the travel time of the surface energy reaching detector 22 is one second, and that the travel time of the energy reflected from discontinuities 17 and 19 are two seconds and three seconds respectively. It will be understood that these values are set forth merely for illustrative purposes and are in no sense limiting values. They are, however, typical of a continuous wave seismic prospecting operation. The source signal, shown as waveform A in FIGURE 2, will be recorded instantaneously as it is produced by the generator 11. One second after the signal is initiated, energy transmitted along the surface will begin to arrive at detector 22. This energy, if recorded separately, would resemble waveform B of FIGURE 2. After another second, the energy reflected from discontinuity 17 will start arriving at the detector and, if separately recorded, would appear as waveform C. At the end of still one more second, energy reflected from discontinuity 19 will begin arriving at the detector and would appear as waveform D if separately recorded. It will be noted that each of these waveforms has lower amplitude values than the preceding one and that the amplitude of the second reflected wave is very much smaller than that of the source wave and the wave transmitted directly to the detector. It will also be noted that at any instant each of the waveforms has a different frequency value. If all of these waves reaching the detector along the surface and by reflected paths were recorded simultaneously as a single trace, as is done conventionally, the composite result would resemble waveform E, an exceedingly complex trace having wide variations in amplitude such that minor events due to the reflected energy are very apt to be obscured by the events representing energy reaching the detector by more direct routes.

The filtered transients which are separately amplified in accordance with the invention by any one of the individual amplifiers shown in FIGURE 1 are represented by waveform F of FIGURE 2. It will be noted that this waveform exhibits much less pronounced variations in amplitude than does the composite waveform E referred to above. The reason for this relatively uniform amplitude is that the high amplitude energy reaching the detector by direct transmission at any instant and that of lower amplitude reflected to the detector from subterranean discontinuities at the same instant have different frequencies. By separating the signal into frequency bands, interference with the amplification of the low amplitude by the high amplitude components can be avoided. As an example of this, it can be seen from FIGURE 2 that during the period when the high amplitude energy transmitted directly to detector 22 has a frequency of about 60 cycles per second, the lower amplitude energy reflected from the first discontinuity may have a frequency of only about 30 cycles per second. Assuming that the individual filters have the band width characteristics shown in FIGURE 1, the direct energy will therefore be recorded on channel 6 of medium 16; while the reflected energy will be recorded on channel 3. Similar frequency differences exist with respect to the energy reflected from shallow discontinuities and that reflected from deeper discontinuities. The result is that the high amplitude signals do not adversely affect the amplification of the later, weaker signals and thus the difficulties otherwise encountered are avoided.

Figure 3:
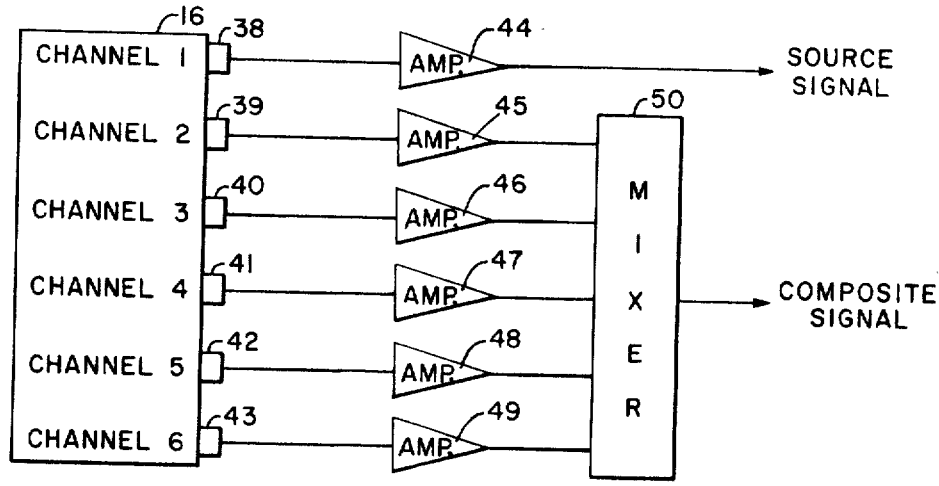
FIGURE 3 is a schematic diagram of apparatus for producing a signal in which the source signal and reflected waves are of approximately the same magnitude; and, FIGURE 4 is a schematic diagram of apparatus for producing a correlated trace in accordance with the invention.

The individual waveforms produced and recorded in the manner described in the preceding paragraphs can be combined in a number of different ways in accordance with the invention to produce a composite trace in which the waves reflected from discontinuities at different levels have approximately the same amplitude. The simplest method for accomplishing this involves a playback of the individual channels through individual playback amplifiers and an output signal mixer. Referring now to FIGURE 3 of the drawing, the individual traces on recording medium 16 corresponding to energy detected by detector 22 are reconverted into electrical transients through playback heads 39 through 43, which are of conventional design. The output signal from each of these heads is passed through one of a bank of playback amplifiers 45 through 49 adapted to produce a signal of predetermined amplitude. The signal from each of these amplifiers is then fed into output signal mixer 50 to produce the composite signal. Circuitry of the output signal mixer, of conventional design, will be familiar to those skilled in the art. The composite signal thus produced may then be rerecorded or may be subjected directly to the normal cross-correlation process. The source signal recorded on channel 1 of the recording medium is at the same time picked up by playback head 38 and passed through amplifier 44 for use in the correlation process. As mentioned earlier, this correlation process is a conventional procedure in the processing of frequency modulated continuous wave prospecting data and need not be discussed at length for purposes of this invention.

Figure 4:
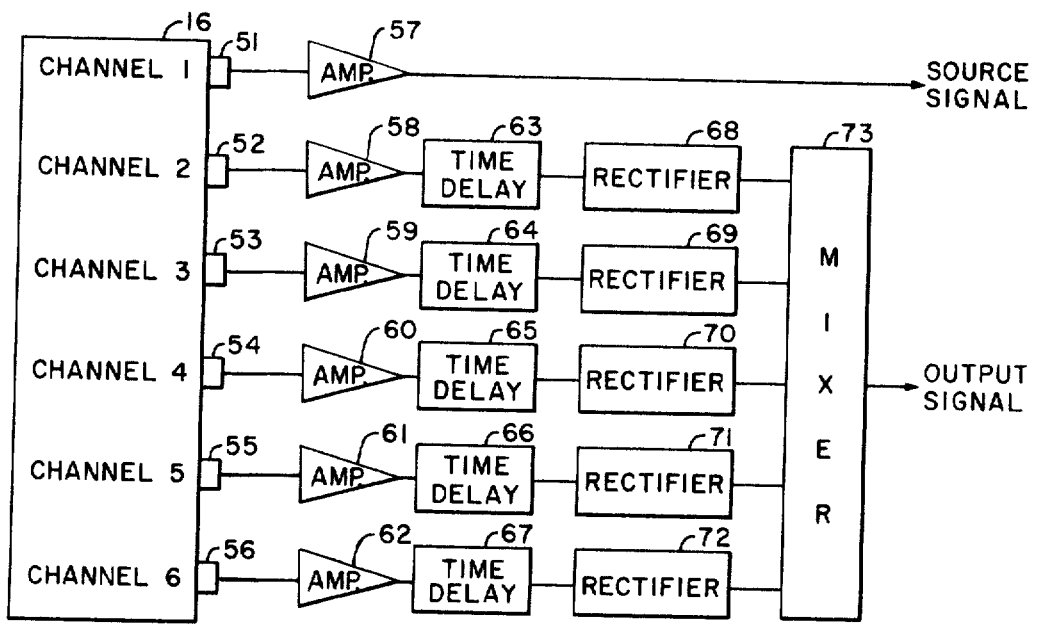

A simpler and sometimes preferred technique for producing an undistorted composite signal from the individual transients involves the use of a bank of playback amplifiers, a bank of time delay units, a bank of full wave rectifiers and a signal mixer. This system is shown in FIGURE 4 of the drawing. The signals recorded on channels 2 through 6 of recording medium 16 are first played back through playback heads 52 through 56 and thus reconverted into electrical transients having frequencies within ranges governed by the band widths of the filters employed during the original recording step of the process. The output of each of the playback heads is then passed through a separate playback amplifier in order to raise the amplitudes of the signals to a useable level. Amplifiers 58 through 62 are provided for this purpose. The original source signal recorded on channel 1 of medium 16 may be simultaneously picked up by playback head 51, passed through amplifier 57 and subsequently rerecorded for comparative purposes. The amplified transients are then fed into a series of time delay units 63 through 67, a separate unit being employed for each transient signal.

The time delay units referred to in the preceding paragraphs may be conventional units of the lumped constant, rotating drum or similar type and are adjusted so that they have delay periods corresponding to the time sequence pattern of the frequency modulated source wave. If the source varied linearly from 20 to 60 cycles per second over a two second interval as assumed earlier, for example, time delay unit 63 which handles channel 2 with a peak frequency value of about 20 cycles per second will have no delay. Time delay unit 64, handling channel 3 with a peak frequency value of about 30 cycles per second, will have a delay of 0.5 second. Unit 65, transmitting channel 4 with a frequency peak of about 40 cycles per second, will have a delay of 1.0 second. Unit 66, accommodating channel 5 with a peak frequency level of about 50 cycles per second, is adjusted to have a delay time of 1.5 seconds. Unit 67 which handles channel 6 with a frequency peak of 60 cycles per second will have a 2.0 second delay. The delay periods of the time delay units thus vary linearly with the linear time sequence of the source signal originally utilized so that the various components of the total signal are emitted by the time delay units in the same sequence and over the same period that corresponding frequencies were produced by source 11 initially. If the source had had a different time sequence, the time delay filters would be set accordingly.

The outputs from the time delay units 63 through 67 are passed individually through full wave rectifiers 68 through 72 and the rectified impulses are then summed in signal mixer 73 to produce a composite output signal. This output signal has maximum values corresponding to the arrival of seismic events having a time succession of frequencies which match the original input source and may be recorded directly as a variable density, variable color, variable area or similar trace by conventional means to produce a record susceptible of visual interpretation and analysis.

It will be recognized that many modifications may be made in the apparatus and method herein disclosed without departing from the scope of the present invention. It will be recognized, for example, that the time delay filters shown in FIGURE 4 may be eliminated by employing a playback device for the reproduction of the signal recorded on playback medium 16 wherein pickup heads 52 through 56 are adjustable and can be staggered in order to provide the necessary delays in the reproduction of the individual filtered traces. Similarly, although the invention has been described in terms of the output of a single geophone, it will be recognized that seismic prospecting operations are normally carried out by recording the outputs of a plurality of geophones on multiple traces to produce a seismic section covering a large area and that the method and apparatus are readily adaptable to multiple trace recording. A further modification in some cases may be the elimination of the intermediate recording of the filtered transients on magnetic tape. These anad other possible modifications will be obvious to those skilled in the art. In view of such modifications, it is intended that the scope of the invention be limited only by the scope of the appended claim.

What is claimed is:

A seismic prospecting method which comprises:
  (a) transmitting a frequency modulated seismic signal into the earth at a point near the earth's surface, said signal being non-repetitive over a time interval greater than that required for seismic wave energy to travel from said point to a remote subsurface stratum and return to the earth's surface;
  (b) generating an electrical signal corresponding to seismic energy returning to a point near the earth's surface from subsurface strata in response to said frequency modulated seismic signal;
  (c) resolving said electrical signal, before any amplification of said signal, into a plurality of electrical transients falling within predetermined frequency bands within the seismic frequency range;
  (d) separately amplifying and recording said electrical transients;
  (e) thereafter reproducing the recorded electrical transients in a delayed time sequence corresponding to the time sequence pattern of said frequency modulated seismic signal;
  (f) rectifying the delayed signals; and
  (g) combining the rectified signals to produce a composite signal.

References Cited by the Examiner

UNITED STATES PATENTS

| | | | |
|---|---|---|---|
| 2,754,492 | 7/1956 | Parker | 340—15.5 |
| 2,826,750 | 3/1958 | Grannemann | 340—15.5 |
| 3,112,397 | 11/1963 | Crook | 340—15.5 |

BENJAMIN A. BORCHELT, *Primary Examiner.*

W. KUJAWA, *Assistant Examiner.*